March 22, 1938.                L. W. MULFORD                2,111,569
               BUILDING BLOCK, ROOFLIGHT, AND THE LIKE
                        Filed June 25, 1936
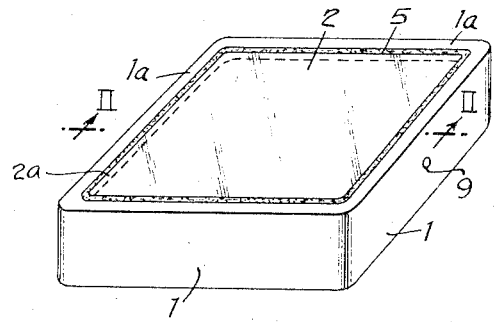
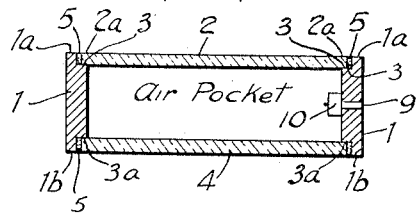     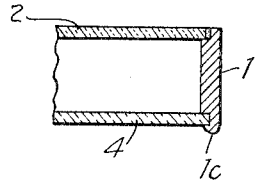
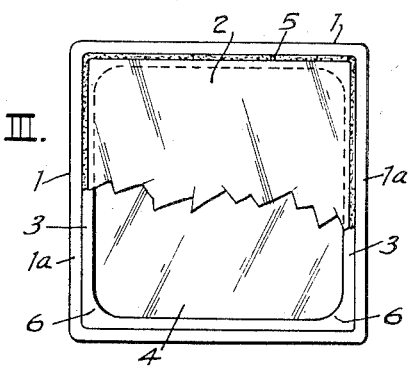
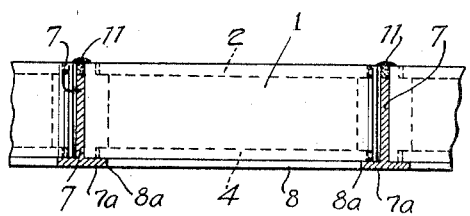
INVENTOR
LOGAN WILLARD MULFORD
BY
his ATTORNEY Patented Mar. 22, 1938

2,111,569

UNITED STATES PATENT OFFICE 2,111,569

BUILDING BLOCK, ROOFLIGHT, AND THE LIKE

Logan Willard Mulford, Kew Gardens, N. Y.

Application June 25, 1936, Serial No. 87,271

18 Claims. (Cl. 72—41)

My invention involves glass lights or sections in the form of blocks or cells suitable for forming the light apertures in rooflights or the like, as well as walls or partitions and similar application. In particular, these cells or blocks provide insulation and comprise between two glass areas an air pocket which may be a dead air pocket to provide the insulation, or in some cases advantageous provision may be made with respect to expansion and contraction due to the heating of the enclosed air.

In general, it consists of a unitary integral frame or rim, in the usual form rectangular, providing a peripheral narrow support for plates of glass spaced apart to form an air pocket between the glasses and enclosed by the peripheral frame. The frame may be of any material desired, but for economy and other objects a frame formed of vitrified material provides a very advantageous construction, for many reasons.

The frame or rim provides the sustaining strength of the block or cell, being integral around the periphery. The glass or like plates on each face are set into each face with suitable sealing, avoiding pressure on the rim transmitting strains to the glass, so that the blocks or cells can be laid up in a wall, or used for roof lights, floor lights or the like. The frame or rim likewise provides for laying up the blocks, or setting them preformed complete in roof apertures, with adjacent cementing or water-proof material binding the sides of adjacent blocks or to load-carrying members, for permanency in a complete water-shedding roof or other structure. While they may be made of baked or vitrified clay with great economy, and readily preformed and then assembled as units like the building up of a brick wall, it serves the purpose, I may form it of fire-brick, china, vitrified clay, terra-cotta, or the like, but the construction provides for the transparent or translucent covering on each face, with means for permanently securing the same with airtight joints to form an insulating block with sides of airtight moisture resistive, load-carrying material of suitable character to meet the requirements of a building block according to my invention. In my construction I may use wire-glass, and thereby particularly meet the requirements desirable, namely, to prevent the dropping of any glass when accidentally broken, thus meeting the protective requirements under certain conditions of use of the invention in buildings. The glass may also be frosted, colored or non-shatterable glass, or any character to meet the particular requirements. In the case of use of my invention for the building-up of partitions or walls in buildings, the form embodying vitrified, baked or fired material, either rough or glazed, permits the laying-up of the blocks with suitable binder between adjacent blocks, still leaving almost the entire area within the rim transparent or translucent, and embodying the air pocket either permanently sealed, or a partial vacuum or vent-controlled. The rim or border structure supporting the glasses detracts practically nothing from the transparency or translucence of the entire block, and if the rim is of opaque material its inner surface may be treated or glazed light and aid diffusion of the light passing through the block.

With reference to transparent or translucent it will be understood as light pervious in any desired degree or character for particular uses of my blocks. In forms of my structure clear or plate glass may be used on one or both faces for full light, or wire-glass, frosted, corrugated, prism, infra-red ray or violet ray resistive or responsive by the quality of material, and for direct or diffusion of light through the plates of suitable material. While the air pocket in my structure provides insulation for practically the entire area of the block, either face may have a plate of best characteristic to resist intense sunlight, or the inner face to best resist a condition of underlying heat, or either, and plates best suited to intercept glare may be used in my block, adding to the advantages of my substantially all-light feature of a block for the many uses applicable.

In the case of roof lights or the like, the individual cells or blocks may be supported in a load-carrying structure either of the fabricated metal type, as set forth in patents previously granted to me, or any other special forms, or with the load-carrying structure of other material. For roof lights, or where such cells or blocks are used in a generally horizontal position, the lower glass, that is the plate of transparent or translucent material, may be rigidly held to the rim or frame by mechanical means, in addition to having its peripheral joint sealed to the rim to make it airtight.

Among other objects are the provision of unit blocks to provide heat insulation by an air pocket, which may be made complete and shipped with lesser liability in the handling or the laying-up or the glazing. The rim or frame material may be glazed or fashioned and formed as to color for advantageous light penetration or diffusion, and arranged for artistic purposes in design of the partitions and walls, and may be set up to meet varying architectural ideas in any particular cases.

With respect to roof lights or the like, the load-carrying structure spanning the aperture in a building may be installed, and the cells or blocks shipped direct from the source of production complete with the air-pocket sealed in each, and thereafter readily installed or set into the light apertures provided for their support in the load-carrying structure, and cemented or held by suitable packing, irrespective of the requirements of the sealing of the individual glass areas with the rim of each individual cell, and provide a complete water-shedding roof surface.

While I prefer to make each block or cell permanently sealed so that the dead air in the pocket provides most advantageous insulation from sunlight, or other variations of temperature, on both sides of a wall or roof light or the like, my construction lends itself to the production of a partial vacuum within the cell, so that no maximum variation of heat, when installed, would cause the contained air to expand to an extent forming any bursting pressure liable to dislodge the plates of glass on either side of a cell.

In general, my invention involves a unit for structural purposes, which may be made as a complete shop or factory-made article, in suitable standard sizes. Such complete permanent units are thus adapted for installation where desired in similar manner to the heretofore used building blocks or bricks, and to permit of insertion as complete units in roof lights, and otherwise, also replacement as complete units greatly simplifies any desired repair or alteration.

While my invention may be embodied in various constructions, particular embodiments are shown in the accompanying drawing, in which:

Fig. I is a perspective view of a block or cell.

Fig. II is a section on line II—II of Fig. I; Fig. II$^a$ is a fragmentary view of one corner of the rim and glass joint, in modified form.

Fig. III is a plan view of a rim for a block, varying in certain details to meet the conditions of production of vitrified material.

Fig. IV is a side view of a single block supported in load-carrying members of a roof light or the like.

In Figs. I and II, a unit cell or block is shown in which 1 is a rim extending continuously around and forming the outer sides of the block of material that forms an airtight wall. A plate 2 of glass or like material, suitably transparent or translucent, is set into one edge of the rim 1 with its edges 2$^a$—2$^a$ if desired flush with the edge 1$^a$—1$^a$ of the rim and engaging a shoulder 3 preferably all around the inner side of the rim 1, in any form providing a water-shedding face on any exposure to weather or where otherwise desired. On the opposite side of the rim a shoulder 3$^a$ similarly provides the shelf or seat for a second plate 4 of glass or like material, inserted so as to form its outer surface substantially flush with the edge 1$^b$ of the rim 1.

A suitable binding and sealing material 5 is inserted between the outer edges of the glass plates 2 and 4 and the juxtaposed rim edges 1$^a$—1$^b$, which may in fact be filled with the sealing material and the plates set into it. Preferably a compound is used which provides not alone an airtight joint, but also accommodates any relative expansion or contraction difference that may occur between the plate and the rim, and still maintain the joint airtight.

Fig. II$^a$ shows, fragmentary, a part of the section in which the rim 1 is modified by having, as there shown, one edge of the rim formed to engage the edge of the glass plate 4, both on the outside as well as the inside. Such construction may be used to hold the edges of both the outer glass plate 2 as well as the plate 4 firmly connected to the rim. For this purpose the rim may be molded and be of such material as will permit a portion of the material in the rim to be curled or pressed over the edge of the glass after placing the glass onto its seat or shoulder 3 or 3$^a$, and then the finished treatment of the rim material by baking or otherwise, effects a permanent holding of the overriding edge. This forms a permanent seal preventing the accidental separation of the glass plate, and also resists any pressure that might result from expansion of the air in the enclosed insulating airpocket. The rim in similar manner may be formed of other material to permanently hold the glass plates in position, and both as to material and form this may be varied in many ways.

As shown in Fig. III, the corners of the surrounding rim or frame 1 have a fillet 6 which serves to strengthen each corner, and in the firing or baking of the material during manufacture, the fillet tends to prevent cracking of the material particularly during cooling, and, furthermore, strengthens the frame or rim to provide more security against cracking due to accident in the handling during transportation or when laying-up.

The outwardly facing surface all around the frame or rim 1 may be formed with a rough finish, particularly when these insulated cells are intended to be laid-up, as in a partition or wall and held together by mortar or cement in a manner similar to the building up of a tile or brick wall. Furthermore, the outer surface may be formed with recesses to better accommodate the binder between adjacent cells, and in some cases may be grooved to accommodate a continuous strip in a wall or partition forming a tongue-and-groove continuous lock, as, for example, in a vertical direction to more securely hold all of the cells in accurate register in the same vertical plane, or any plane in which they are laid-up.

In Fig. IV load-carrying members 7—7 are shown in section, as members of a roof light or the like with a cross-plate 8 spot welded, or as otherwise secured, as at 8$^a$, to the flange 7$^a$ of the load-carrying members 7—7. The plate 8 has its upper surface in the same plane as the upper side of the flanges 7$^a$—7$^a$, and such plates 8 are positioned at intervals registering with the edges of adjacent blocks or cells, so that they support the rim of each cell which, though narrow, is of material usually opaque, or due to depth less light pervious, and therefore the plates 8, as well as the flanges 7$^a$, do not in any way reduce the light area which is free for the passage of light direct or reflected from the rim walls through the glass face portion of the block or cell.

As it is immaterial to have any light transmitted through the surrounding edges of the cell, the construction of my cell with terra-cotta or other suitable material, or even metal, does not detract from the light transmission through this insulating block or cell to any material extent, while the glazing or suitable coloring of the rim aids in the light transmission or reflection. While the rim or side walls of vitrified clay serve my purpose, various other materials may meet the essential requirements for load carrying strength, water proofness, moisture resistive and the characteristics for binding and sealing, and other features. A hardened surface, by firing, pressing, fusing or otherwise, aims to prevent ruinous absorption of moisture, and for laying up in walls, as with mortar or the like between blocks, the outer surface of blocks is suitable for adhesion with the binding material. The terms of the claims will be understood as construed to meet the above, and requirements for a commercially practical and permanent article. Likewise reference to flat outside surface will be understood as a general level face though it may be roughened, corrugated or otherwise.

As shown in Fig. I, a vent 9 may be provided. This may be done when moulding and firing the material when made of baked or fired earth, clay, or the like. Then upon insertion of the plates 2 and 4 on opposite sides of the block, transparent or translucent "brick" or cell, it may be heated to a degree greater than the maximum expectation in the permanent use of the article, and the vent then plugged and upon cooling it serves to draw the plates 2 and 4 tight onto their seats and firmly into the cementing or expansion joint material, insuring airtightness. When so produced, any further cooling serves to more firmly hold the plates into position, but no heating below the original temperature of assembly causes any expansion tending to loosen the airtight joints between the plates of glass or like material and the surrounding rim in the form herein specifically described. As shown in Fig. II, there may also be, if desired, a valve 10 of simple construction, which permits the egress of surplus air upon heating, but prevents the ingress of any air or moisture. When so made the valve serves to prevent internal air pressure from loosening the plates, and with the slight variation of temperature in their permanent use there is simply a constant assurance of airtightness and prevention of moisture accumulation in the interior.

When used as in Fig. IV, as cells or glass-lights or lenses, in the supporting structure of a roof light or the like, my pre-manufactured cells or blocks are simply dropped in place with a clearance on the outer sides of the rim and the deep web of the structural load-carrying members 1—1, and the space thus formed is filled in the usual manner with expansion material 11 forming a water-tight joint and a water-shedding roof light exposed surface, as well as an expansion joint to accommodate any variations in the whole structure due to temperature changes. It will be noted that the clearance between the outer sides of the preformed blocks and the webs forms spaces which are filled with material forming a water-tight joint, which therefore clings to the web and to the surface of the block sides and secures the blocks rigidly in the structure. It will be furthermore noted that the web forms a positioning member for the light pervious insulating blocks, permitting their implacement and by the relative area of web sides and block-rim sides securely hold the blocks while still permitting individual blocks to be removed, the sealing material scraped off, and ready replacement of individual blocks without in any way disturbing adjacent blocks, while also providing for the sealing material to cover at least one edge of the web and extend flush with the faces of juxtaposed blocks.

As heretofore described, the article, such as illustrated in Figs. I and III, is a building block complete, shop-made, and a unit suitable for setting up in a building partition, or to form a wall, or as otherwise described. While shown rectangular, the block may be of different forms, and the rigid border while preferably made of baked or fired clay or like material, may be of any other suitable formative material to provide a rigid rim and the desired configuration to engage and hold the translucent plates at both faces. And, as shown, the outwardly facing surface around the rim or border is flat, that is to an extent level and preferably uniform so that adjacent blocks may be set together edge-on-edge, and will transmit load in the plane of the assembled wall partition or the like, when used for such purposes. While I have referred in appended claims to outwardly facing surfaces of the block being flat, it will be understood that their configuration provides for a stable engagement, with mortar or cement, between adjacent block surfaces, though the surfaces may be roughened or irregular in any desired manner for interengagement and even to interlock, and form a lasting interengagement between block edges without the chance of their slipping out of the common plane in which they are set up. The translucent plate on each face being inset on the inner side of the edges of the rim, with a suitable packing, sealing or expansion material, the plates are free from load strains or shear stresses. As shown, the plates are preferably inset and may be flush with or below the edges of the border, and thus protected by the unitary structure from pressure or chipping, while, of course, embossing or surface configuration may project beyond the plane coincident with the edges of the border, there is no outside part or material of a wall, vault-light, skylight or other structure necessary for the unitary support of all parts of my building block.

While appended claims may refer to a building wall or the like, such is to be understood as likewise applying to partitions, rooflights, skylights, vault-lights or similar structures, in the use of which the advantages of my shop-formed block is of signal advantage. Likewise, while claims may refer to translucent material for the sheets or plates covering the two faces of my block, it is understood, as hereinbefore described, that such may be plain glass, or any variety of glass, wireglass, or compositions of different degrees of transparency or translucency. Likewise, for varying installations one or the other of the translucent or like sheets may be of the necessary strength to be load-carrying where roof lights or the like require, and may be subject to variations in dimensions, strength or physical characteristics, and particularly light characteristics. It will therefore be understood that the terms used in the claims are not to be considered as specifically limited to the precise wording designating the different elements.

It will be understood that many variations may be made from the particular form or forms of structure herein specifically shown and described, as to dimensions, materials, arrangement or otherwise, and refinements and details or features added or modified, without departing from my invention,—which are within the purview of my invention.

What I claim and desire to secure by Letters Patent is—

1. A roof light having load supporting rigid members to span a roof aperture and form panels with a plurality of clear openings, means surrounding each opening to support a light pervious insulating unitary preformed block comprising a narrow continuous peripheral rim of material non-penetrative to moisture permanently combined with light pervious faces.

2. A rooflight having load-supporting structural members traversing a light aperture and leaving openings, means in said openings providing a support for light pervious insulating building blocks insertable and removable as a unit, each block comprising an integral solid load-carrying rim adapted to engage said means of support in a rooflight opening, and light pervious faces on opposite faces of the block held by and permanently combined with the rim.

3. A rooflight or the like, having load-supporting structural members traversing a light aperture preformed and forming the main load-supporting structure and leaving openings having means forming a plurality of receptacles for glasses, a preformed integral block adapted to span said openings and constitute the glass section comprising a peripheral preformed frame of hardened moisture-proof material, glass or like plates sealed to the edges of said frame on the outer and inner sides of said block and spaced from each other to form an integral block unit with an airpocket forming the transparent section in the aperture of the roof light.

4. A rooflight having load-supporting structural members forming a plurality of light apertures, means thereon to support light blocks comprising a self-sustaining surrounding rim adapted to engage the supporting means on the roof light structure, and having two airtight light pervious plates supported by and intermediate said rim periphery and sealed against the edges thereof.

5. A rooflight having load-supporting structural members disposed to form a plurality of light apertures, means on said structural members to support unit light blocks having each a preformed strain-resisting surrounding rim for engagement with said means of support on the structural members, and said rim adapted to receive and form the sole support of a light pervious airtight plate on each side of said block spanning the area surrounded by the rim.

6. A rooflight having a load-supporting structure preformed with members traversing each other and leaving light apertures, means on said structure at said apertures to support in each aperture a light block preformed as a unit having solid opaque surrounding rim and having a light pervious sheathing permanently secured to the bottom edge of said rim and a light pervious upper sheathing secured to said rim, both sheathings being wholly supported by and hermetically sealed to the surrounding edges of said rim of the light block.

7. In a rooflight, a load supporting structure having members traversing the light opening to form sectional openings for substantially all-light passage, means in each opening providing an under-support for a light-pervious member consisting of an insulating light block having light-pervious faces and combined spacing rim forming continuous combined sides of the block, means on the traversing members to position the lower edges of said blocks, and expansion and sealing material between adjacent sides of blocks weather-proofing said positioning means on the traversing members, sealing the sides of the blocks and finishing flush with the outerface of the blocks, whereby a water-shedding, insulating and light-pervious roof or ceiling is provided.

8. A rooflight, floorlight, or like closure for openings in buildings, having, in combination, a framework provided with a plurality of apertures, a light element of low thermal conductivity having a continuous peripheral rim and light pervious faces, webs of relatively higher thermal conductivity constituting part of the framework and at least partially surrounding said light elements, said webs spaced between the sides of juxtaposed light elements and forming therebetween a space relatively narrow compared with the area of the adjacent side of the web, sealing material filling said space and clinging to both surfaces and having sealing material over the edge of said web and filling the space to and substantially flush with the faces of adjacent light elements.

9. A building block formed as a unit having an integral narrow surrounding airtight border of hardened moisture resistive material forming the main load-carrying member of said unit, and spaced glass or like plates supported by and permanently sealed against the edges of said border.

10. A unit building block of the character described, having a single piece integral peripheral strain-carrying rim of hardened moisture resisting material and oppositely disposed substantially parallel light pervious face plates supported and held sealed against the edges of the rim.

11. A building block formed with faces of two plates of light pervious material of substantially equal size and shape, a peripheral thin walled rim forming spacing support for said plates and load carrying sides of the block, means forming an air sealed permanent engagement for the edges of the face plates each against one edge of the rim.

12. An insulating light block for buildings, consisting of an integral unit having a rigid preformed peripheral frame of hardened waterproof material and having the entire area between the edges of the frame spanned by two sheets of light pervious material attached to opposite edges of the rigid peripheral frame and spaced from each other and permanently sealed to the frame, whereby an air-pocket is formed only slightly less than the cube of the block.

13. A building material unit consisting of a solid preformed frame of moisture resistive material having relatively greater depth than thickness, recesses on the inside of the edges of said frame adapted to receive and position translucent plates, translucent plates adapted to engage said recesses and be supported thereby and material permanently sealing the edges of said plates in their recesses each against one edge of the frame, whereby a substantially air-locked compartment is formed for heat insulation by said unit.

14. A light pervious insulating building block having a narrow continuous peripheral rim of hardened moisture resistive material, flat surfaces on all sides of the outer surface of the rim, a recess on the inner side of the edge of the rim throughout its periphery, and plates of light pervious airtight material inset into said recesses of said rim and sealed airtight therein.

15. An article of structural material consisting of a block unit with a solid peripheral preformed narrow rim of waterproof material of greater depth than thickness, two sheets of waterproof light pervious material spanning the entire interior of the rim structure and each insetting throughout its edge a recess in and secured to the edge of the rim, whereby light pervious panes are combined with the rim material to form an interior permanently sealed air pocket of substantially the whole block.

16. An insulating block or cell unit for building construction, comprising a unitary frame of moisture resistive material forming the main strain or load-resistance of the unit, wire-glass plates spanning the area between the borders of said frame, and cooperating means between the sheets of wire-glass and the frame adapted to hold and hermetically seal the edges of the wire-glass sheet against edges of said frame.

17. An insulating light penetrable building block consisting of a narrow rigid load carrying border of moisture resisting material forming the rim of the block, a light pervious airtight plate on each face of the block, an inset seat in each edge of the border to receive the edge of a plate and material to hold each plate against the edge of the border and hermetically seal it to form the block into an air cell, and means for release of air upon changes of temperature in the block.

18. A structural material cell consisting of a relatively narrow integral border formed as a single member in rigid conformation around said cell, outer and inner translucent plates, and inter-engaging means with edges of said border and binding and sealing material at said edges to weather-seal the same and form a substantially hermetically sealed air-pocket, a vent for said pocket adapted during fabrication to permit partial evacuation of the air, and means for thereafter sealing the block whereby a partial vacuum is permanently established within the insulating block.

LOGAN WILLARD MULFORD.